(12) United States Patent
Krammer

(10) Patent No.: US 11,167,652 B2
(45) Date of Patent: Nov. 9, 2021

(54) PRIMARY COIL UNIT

(71) Applicant: Bayerische Motoren Werke Aktiengesellschaft, Munich (DE)

(72) Inventor: Josef Krammer, Holzkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 198 days.

(21) Appl. No.: 16/146,467

(22) Filed: Sep. 28, 2018

(65) Prior Publication Data

US 2019/0074720 A1 Mar. 7, 2019

Related U.S. Application Data

(63) Continuation of application No. PCT/EP2017/052136, filed on Feb. 1, 2017.

(30) Foreign Application Priority Data

Mar. 31, 2016 (DE) ..................... 10 2016 205 352.3

(51) Int. Cl.
*H02J 7/00* (2006.01)
*H02J 7/14* (2006.01)
*B60L 53/126* (2019.01)
*H01F 38/14* (2006.01)
*B60L 53/38* (2019.01)
*H02J 50/90* (2016.01)
*H02J 50/10* (2016.01)
*H01F 1/10* (2006.01)

(52) U.S. Cl.
CPC ............ *B60L 53/126* (2019.02); *B60L 53/38* (2019.02); *H01F 1/10* (2013.01); *H01F 38/14* (2013.01); *H02J 50/10* (2016.02); *H02J 50/90* (2016.02); *Y02T 10/70* (2013.01); *Y02T 10/7072* (2013.01); *Y02T 90/12* (2013.01); *Y02T 90/14* (2013.01)

(58) Field of Classification Search
USPC ............................................... 320/107
See application file for complete search history.

(56) References Cited

U.S. PATENT DOCUMENTS

| 2008/0129246 | A1* | 6/2008 | Morita | B60L 5/005 |
| | | | | 320/108 |
| 2010/0117596 | A1 | 5/2010 | Cook et al. | |
| 2011/0018360 | A1* | 1/2011 | Baarman | H02J 50/40 |
| | | | | 307/104 |
| 2013/0099730 | A1* | 4/2013 | Yoon | H02J 50/70 |
| | | | | 320/108 |

(Continued)

FOREIGN PATENT DOCUMENTS

| CN | 101809842 A | 8/2010 |
| CN | 105191064 A | 12/2015 |

(Continued)

OTHER PUBLICATIONS

PCT/EP2017/052136, International Search Report dated Apr. 6, 2017 (Three (3) pages).

(Continued)

*Primary Examiner* — Alexis B Pacheco
(74) *Attorney, Agent, or Firm* — Crowell & Moring LLP

(57) ABSTRACT

A primary coil unit is configured for electromagnetically coupling with a secondary coil unit. The primary coil unit includes a primary coil and a primary ferrite, where the primary coil is movably supported relative to the primary ferrite.

4 Claims, 5 Drawing Sheets

(56) References Cited

U.S. PATENT DOCUMENTS

| | | | |
|---|---|---|---|
| 2013/0244735 A1 | 9/2013 | Bury | |
| 2014/0232328 A1* | 8/2014 | Pegg | G04C 10/00 320/108 |
| 2014/0327391 A1 | 11/2014 | Niederhauser et al. | |
| 2015/0042429 A1 | 2/2015 | Lee | |
| 2015/0077053 A1* | 3/2015 | Stamenic | H02J 7/00302 320/109 |
| 2015/0137933 A1* | 5/2015 | Czainski | H01F 41/06 336/84 R |
| 2015/0170833 A1* | 6/2015 | Widmer | B60L 53/122 307/104 |
| 2015/0280482 A1* | 10/2015 | Rosenfeld | H02J 50/70 320/108 |
| 2015/0326053 A1* | 11/2015 | Amano | H02J 7/00 320/108 |
| 2016/0056664 A1* | 2/2016 | Partovi | B60L 53/122 307/104 |

FOREIGN PATENT DOCUMENTS

| | | |
|---|---|---|
| DE | 976 782 C | 4/1964 |
| DE | 10 2011 077 427 A1 | 12/2012 |
| DE | 10 2013 000 900 A1 | 7/2014 |
| EP | 0 788 212 A2 | 8/1997 |
| JP | 2015-080324 A | 4/2015 |
| WO | WO 2015/128450 A1 | 9/2015 |

OTHER PUBLICATIONS

German Search Report issued in German counterpart application No. 10 2016 205 352.3 dated Dec. 28, 2016, with Statement of Relevancy (Ten (10) pages).

Chinese Office Action issued in Chinese counterpart application No. 201780005776.4 dated Sep. 4, 2019, with English translation (Fourteen (14) pages).

* cited by examiner

PRIMARY COIL UNIT

CROSS REFERENCE TO RELATED APPLICATIONS

This application is a continuation of PCT International Application No. PCT/EP2017/052136, filed Feb. 1, 2017, which claims priority under 35 U.S.C. § 119 from German Patent Application No. 10 2016 205 352.3, filed Mar. 31, 2016, the entire disclosures of which are herein expressly incorporated by reference.

BACKGROUND AND SUMMARY OF THE INVENTION

The invention relates to a primary coil unit, which is suitable for electromagnetically coupling with a secondary coil unit, wherein the primary coil unit comprises a primary coil and a primary ferrite, and to a method for the supply of electrical components with electric power by means of an inductive charging system having a primary coil unit and a secondary coil unit.

Vehicles with an electrically-powered drive typically incorporate a battery, in which electrical energy for the operation of an electrical machine of the vehicle can be stored. The vehicle battery can be charged using electrical energy from a power supply network. To this end, the battery is coupled to the power supply network, in order to permit the transmission of electrical energy from the power supply network to the vehicle battery. Coupling can be executed by a wired arrangement (using a charging cable) and/or by a wireless arrangement (by means of inductive coupling between a charging station and the vehicle).

One approach to automatic inductive wireless charging of the vehicle battery involves the transmission of electrical energy to the battery from the road surface to the vehicle underfloor by means of magnetic induction across the underfloor space. To this end, the vehicle incorporates a secondary charging unit, which interacts with an off-board primary charging unit by means of magnetic coupling.

In the interests of efficient inductive coupling, it is necessary that losses in the coils of the primary charging unit and the secondary charging unit should be maintained as low as possible, and that the position of the two charging units during charging, in the x direction and the y direction of the vehicle (according to the axis coordinate system of a vehicle which is known by a person skilled in the art) should coincide insofar as possible.

According to the prior art, c.f., for example, document US 2010117596A, systems for the accurate positioning of a vehicle on a parking space are therefore proposed, which incorporate a primary coil unit, in order to permit the achievement of optimum magnetic coupling.

One object of the invention is to provide an improved primary coil unit, which is suitable for electromagnetically coupling with a secondary coil unit, wherein the primary coil unit comprises a primary coil and a primary ferrite, and to specify an improved method for the supply of an electrical component with electric power, wherein an inductive charging system having a primary coil unit and a secondary coil unit is employed.

According to the invention, the primary coil is movably supported relative to the primary ferrite.

This means that the primary coil unit, which incorporates the primary coil and the primary ferrite, is configured such that the primary coil is not rigidly connected to the primary ferrite, but is displaceably supported in relation to the latter.

To this end, according to one form of embodiment of the invention, the primary coil is preferably configured as a circular coil, wherein the primary ferrite assumes a planar basic shape, having a first side and a second side, and the primary ferrite is designed to accommodate the primary coil in the weight thereof, in a cooperating arrangement with the first side of said planar basic shape. Other types of coils, which can cooperate with the primary ferrite in a stable arrangement, can also be employed.

The displaceable arrangement of the primary coil relative to the primary ferrite can thus be achieved, in that the primary ferrite assumes a planar basic shape, e.g. in the form of an oval, rectangular or circular plate-type design. As a planar design, by definition, essentially comprises two sides, reference is made here to the first side and the second side. On one of the two sides, described here as the first side, the primary coil, in the intended use of said primary coil, in response to the weight thereof, preferably engages with the first side of the primary ferrite, and is movable relative to the primary ferrite, in the plane in which the planar basic shape of the primary ferrite extends. In other words in the intended use, the primary coil thus exerts the mass-related weight force thereof essentially on the first side of the primary ferrite plate.

The relative movability of the primary coil relates to the plane of the primary ferrite plate, i.e. if the primary coil moves, a plane-parallel movement is executed in the direction of extension of the primary ferrite plate, and relative to said primary ferrite plate.

According to a further variant of the invention, the primary coil unit incorporates at least one ferrite element, wherein the at least one ferrite element is movably supported relative to the primary ferrite.

In other words, the primary coil unit, in addition to the primary ferrite, additionally incorporates at least one further ferrite element, which is movably supported relative to the primary ferrite. Accordingly, both the primary coil and the at least one further ferrite element are movably supported relative to the primary ferrite.

Preferably, the at least one ferrite element is supported relative to the primary ferrite in a hinged arrangement, wherein the ferrite element is supported in a fold-out/foldaway arrangement in the plane constituted by the planar basic shape of the primary ferrite.

Whereas the primary coil is movably supported for displace in the plane of the primary ferrite, the at least one ferrite element can be hinged relative to the planar basic shape of the primary ferrite. The ferrite element, upon the hinging thereof, can thus be folded out of the flat plate-type plane of the primary ferrite, or can be folded away into the latter. In this manner, the magnetically active surface area within the primary coil unit which, in any event, incorporates the magnetically active surface area of the primary ferrite, is reduced or expanded at the location of the ferrite element. Depending upon the operating situation of the primary coil unit, either an expansion or a reduction of the magnetically active surface area of the primary coil unit at the location of the ferrite element may be desired. This expansion or reduction can be achieved by the corresponding foldaway or fold-out of the ferrite element.

According to a further variant of the invention, the at least one ferrite element incorporates a magnetically non-conductive screening element, and said magnetically non-conductive screening element, when the ferrite element is folded away, constitutes a continuation of the second side of the planar basic shape of the primary ferrite.

The second side of the planar basic shape of the primary ferrite, as described above, is that side of the primary ferrite which lies opposite the first side of the primary ferrite, with which the primary coil engages in the intended use of the primary coil unit. When ferrite elements are folded away into the plane of the primary ferrite, the screening elements thus lie in the plane of the primary ferrite, but on that side of the primary ferrite which is averted from the primary coil. When ferrite elements are folded out of the plane of the primary ferrite, the screening elements are virtually perpendicular to the plane of the primary ferrite. This means that, with a ferrite element folded out, not only is the magnetically active surface area of the primary ferrite reduced at this location on the relevant ferrite element, but additionally that the magnetically non-conductive screening element suppresses the propagation of stray magnetic fields. Consequently, these elements not only contribute, in the foldaway position, to the optimization of magnetic flux behavior in the primary ferrite, but also, in the fold-out position, to the screening of harmful stray fields.

According to an advantageous further development of the invention, the primary coil unit incorporates a plurality of ferrite elements. This plurality of ferrite elements are arranged, relative to the primary ferrite, such that the primary ferrite, along the planar basic shape, is entirely enclosed by ferrite elements.

In this manner it is ensured that, in the flat base plane of the primary ferrite, said primary ferrite is enclosed by foldaway and fold-out ferrite elements. In each direction in the plane of the primary ferrite, the magnetically conductive surface area of the primary charging unit can thus be optionally increased (with the elements folded away) or reduced (with the elements folded out).

According to a further variant of the invention, the plurality of ferrite elements comprise groups and sub-groups of ferrite elements, wherein the primary coil unit, for each respective sub-group of ferrite elements, incorporates a suspension device for the constituent ferrite elements of the sub-groups, and one group of ferrite elements comprises a plurality of sub-groups of ferrite elements, wherein the primary coil unit, for each respective group of ferrite elements, comprises a ferrite element control unit, by means of which the respective suspension devices of the constituent sub-groups of ferrite elements in the group are controllable, in order to foldaway or fold-out the ferrite elements in a sub-group.

In other words, not each individual ferrite element needs to be individually controllable, i.e. able to be folded away or folded out, but a plurality of ferrite elements can be combined in groups and sub-groups, which are hinged in combination. One sub-group of ferrite elements is arranged on the same suspension device, i.e. the entire sub-group can be folded away or folded out. The control unit can control a plurality of such sub-groups, i.e. can execute the mutually independent foldaway or fold-out of the ferrite elements thereof, wherein said plurality of sub-groups constitutes a group, or the entire group of ferrite elements is folded away or folded out.

It is essential that the effective magnetic surface area of the primary coil unit is adjustable by the hinging of the ferrite elements, wherein the maximum effective magnetic surface area is given by the surface area of the primary ferrite and the constituent surface areas of all the ferrite elements, where the latter are folded away, and the minimum effective surface area is given by the surface area of the primary ferrite alone. By the hinging of a sub-quantity of ferrite elements, a surface area size setting between these two extreme surface areas can be achieved.

Particularly advantageously, a charging system comprises a primary coil unit of this type and a secondary coil unit, wherein the primary coil unit is suitable for electromagnetically coupling with the secondary coil unit, such that an electrical component which is connectable on the secondary side can be supplied with electric power.

The charging system thus comprises, additionally to the primary coil unit according to the invention or the further development thereof according to the invention, a secondary coil unit, in order to permit the transmission of electric power by the electromagnetic coupling of the primary coil unit to the secondary coil unit. The secondary coil unit can be a secondary charging unit from the prior art.

A method according to the invention is moreover proposed for the supply of an electrical component with electric power using an inductive charging system having a primary coil unit and a secondary coil unit. The method comprises the following steps:

setting a rough position of the secondary coil unit relative to the primary coil unit, in order to permit the establishment of electromagnetic coupling between the primary coil unit and the secondary coil unit, displacement of a primary coil in the primary coil unit relative to a primary ferrite in the primary coil unit in a preferred direction, from a starting position of the primary coil to a charging position of the primary coil, in order to increase the electromagnetic coupling factor of the rough position of the secondary coil unit relative to the primary coil unit, wherein the preferred direction lies in the plane of a planar basic shape of the primary ferrite, and expansion of the magnetically active surface area of the primary charging unit in the plane of the planar basic shape of the primary ferrite, in the preferred direction of displacement of the primary coil, in order to further increase the magnetic flux through the primary coil and the secondary coil unit in the charging position, and/or reduction of the magnetically active surface area of the primary charging unit in the plane of the planar basic shape of the primary ferrite, against the preferred direction of displacement of the primary coil, in order to minimize stray fields in the primary coil and the secondary coil unit in the charging position.

Firstly, in order to permit the transmission of electric power using the charging system, by the electromagnetic coupling of the primary coil unit to the secondary coil unit, the secondary coil unit is roughly spatially positioned in relation to the primary coil unit. In a rough position of this type, which is generally set by the parking of the vehicle, although electromagnetic coupling between the two units can be achieved, the coupling factor in the rough position is not generally optimal. In the interests of the optimization thereof, in a further step, the primary coil of the primary coil unit is displaced relative to the primary ferrite of the primary coil unit along a preferred direction from a starting position of the primary coil to a charging position of the primary coil.

This displacement can be achieved by one of a number of possible measures, or by a combination of a plurality of said measures. An interactive magnetic arrangement is conceivable between magnetic fields generated for the positioning process, in the form of primary- and secondary-side positioning coils. The primary and secondary coils themselves can be deliberately employed for this purpose too. Preferably, however, positioning motors, which deliver a displacement force to the coil by means of cable pulls or connecting rods, are employed. In order to permit any desired positional setting of the primary coil in a two-dimensional plane, the integration of two positioning motors is provided. A planar displacement path of +/−10-20 cm, in each direction of the plane, should be permitted.

The setting of the control motors for the positioning of the coils can be achieved by the setting of a localized maximum value for the transmission efficiency of electric power between the primary and secondary coils. In the charging position, the coupling factor is improved, in comparison with the coupling factor in the rough position. The preferred direction of displacement lies in the plane of the planar basic shape of the primary ferrite. In a final step, the magnetic flux of the alternating field for the transmission of electric power is further optimized, wherein the magnetically active surface area of the primary ferrite in the plane of the planar basic shape of the primary ferrite is adapted to the charging position of the primary coil. The effective surface area in the region of the charging position is thus increased, i.e. in the direction in which the displace of the primary coil has been executed in the preceding step. Additionally, the magnetically active surface area of the primary ferrite can be reduced, in the direction from which the primary coil has been displaced in the preceding step. In this manner, the magnetic flux in the primary ferrite is suppressed at those locations in which said flux is ineffective for the purposes of power transmission. In other words, a magnetically active surface area can be adjusted by the hinging of the ferrite such that, in the charging position, the primary coil is centered on a magnetically active surface, i.e. the coil and the surface area constituted by hinging share a common geometrical center point in the plane of the primary ferrite.

According to a further development of the method for the supply of an electrical component with electric power using an inductive charging system having the primary coil unit and the secondary coil unit, the following steps are executed:

setting a rough position of the secondary coil unit relative to the primary coil unit, in order to establish electromagnetic coupling between the primary coil unit and the secondary coil unit, displacement of the primary coil relative to the primary ferrite in a preferred direction, from a starting position to a charging position, wherein the preferred direction lies in the plane of the planar basic shape of the primary ferrite, in order to increase the electromagnetic coupling factor of the rough position of the secondary coil unit relative to the primary coil unit, fold-out of ferrite elements which are initially folded away, relative to the primary ferrite, by the actuation of one or more ferrite element control units, wherein those ferrite elements are folded out which, in the charging position, are arranged with the largest clearance to the primary coil, and/or foldaway of ferrite elements which are initially folded out, relative to the primary ferrite, by the actuation of one or more ferrite element control units, wherein those ferrite elements are folded away which, in the charging position, are arranged with the smallest clearance to the primary coil, such that a magnetically active surface area is constituted, upon which the primary coil, in the charging position and in the viewing direction, is centered perpendicularly to the plane of the planar basic shape of the primary ferrite.

According to this method, for the purposes of the enlargement and/or reduction of the magnetically active surface area of the primary ferrite, ferrite elements in the plane of the planar basic shape of the primary ferrite are folded away or folded out. For the optimum transmission of power and energy, those ferrite elements are or remain folded away which, in the region of the charging position, into which the primary coil has been displaced in the preceding step, are located in the plane of the primary ferrite. Those ferrite elements which are arranged with a greater spatial clearance from this charging position are or remain folded out. By the targeted fold-out or foldaway of ferrite elements, a magnetically active surface area is constituted, upon which the primary coil is centered, i.e. the primary coil, in the viewing direction, is centered on the primary ferrite, perpendicularly to the plane of the planar basic shape of the primary ferrite. As a result of the preceding process step, in this viewing direction, the secondary coil is likewise centered on the magnetically active primary-side surface, and is thus also centered on the primary coil. Consequently, the magnetic flux conducted in the magnetically active surface area is concentrated at that location in which the primary coil is also located, such that the maximum permeation of the primary coil and the secondary coil by the alternating magnetic field for the transmission of power is achieved.

The invention is based upon the following considerations:

Vehicles with an electrically-powered drive system typically incorporate a battery, in which electrical energy for the operation of an electrical machine of the vehicle can be stored. The vehicle battery can be charged using electrical energy from a power supply network. To this end, the battery is coupled to the power supply network, in order to permit the transmission of electrical energy from the power supply network to the vehicle battery. Coupling can be executed by a wired arrangement (using a charging cable) and/or by a wireless arrangement (by means of inductive coupling between a charging station and the vehicle).

In addition to cabled charging, the wireless inductive charging of electric and plug-in hybrid vehicles constitutes a further variant of charging, which is characterized by a high degree of convenience and is therefore considered as an attractive option for the end user.

State-of-the-art charging, in the case of inductive charging, proceeds substantially automatically. Energy transmission occurs over a relatively wide air gap at the vehicle underfloor, in the z-direction, by means of the inductive coupling of an off-board primary coil with an in-vehicle secondary coil. The two coils in combination constitute a detachably-coupled transmission device. The wide air gap which, particularly in the case of off-road vehicle models, can reach high values (values in excess of 20 cm in the z-direction of the vehicle), can be critical to energy transmission. Additionally, horizontal displacements in the x- and y-directions of the vehicle also occur, since a parking procedure for the positioning of the two coils relatively to each other can only be executed with a finite degree of accuracy. The objective of current systems is to achieve the maximum possible tolerance with respect to any offset in the x- and/or y-direction, such that parking up for the end user, i.e. the mutual positioning of the coils, can be achieved in a simple, rapid and convenient manner.

Without loss of generality, circular coil units are assumed, customarily in an essentially quadratic design arrangement. The coil units are respectively comprised of the actual coil itself and a ferrite. In many cases, the coil winding is configured such that the winding is simply "applied" to the planar ferrite; however, more complex 3D structures are also possible in which, e.g. the coil is enclosed by the ferrite in a space-saving arrangement.

Coil systems according to the prior art have a disadvantage in that, where a vehicle is parked with an offset to a stationary floor-mounted primary coil (offset in the x- and y-direction), a field characteristic is produced wherein, as a result of the lateral offset, only a limited number of field lines "flow through" the secondary coil. This results in a reduced coupling factor of the detachably-coupled transmission device, and thus a reduced efficiency of energy transmission; electromagnetic losses are high. According to the prior art, the means whereby a person skilled in the art endeavors to resolve this issue involve the astute actuation of coils, such that losses in relation to the quantity of energy which can still be transmitted are minimized, in order to positively influence the efficiency of transmission with a reduced overall transmission capacity. Approaches are also known, whereby a x-y-offset is corrected, for example by the displacement of the primary-side coil unit as a whole—see, for example, DE 102011077427 A1. However, if the entire primary coil unit is tracked, this would involve the movement of a very large and heavy unit. A complex mechanism is required in consequence, which must additionally satisfy the requirement for overrun limit protection.

An improved technical solution for the management of the x-y-offset is therefore proposed. An approach is selected, wherein only elements of the primary coil unit are displaced. Only the winding of the primary coil is displaced relative to the ferrite, such that the field can be virtually optimally adjusted to the secondary coil (which is offset as a result of an inaccurately parked vehicle). Displacement is relatively easy to achieve, as the winding of the primary coil rests on the ferrite, the copper winding, e.g. in combination with a plastic carrier, has a very low weight and is configured with relatively small dimensions. The coupling factor associated with a primary coil winding which is displaced relative to the ferrite of the primary coil and relative to the secondary coil approximates closely to that of a system with an ideally-positioned secondary coil. Displacement can be achieved by means of positioning motors.

A further option for optimization is however provided in that the horizontal "range" of magnetic control in the direction of displacement of the primary coil winding is adapted to the edges of the primary ferrite, without the necessity for the movement of the large and heavy primary ferrite as a whole. To this end, elements of the ferrite are folded out or folded away. In the edge region, the primary ferrite is thus segmented into individual ferrite elements. Accordingly, by the fold-out and foldaway of elements, magnetic conductivity can be established in a preferred direction, and suppressed in other directions. Additionally, the ferrite elements can be equipped with screening plates of non-magnetically-conductive metallic materials, in order to minimize any stray fields in the fold-out state. Any "bypassing" of the interspaces between one ferrite element and the next can also be prevented by the screening effect of the plates. The fold-out function can also be associated with the positioning motors, which are designed for the displacement of the coil. To this end, the positioning motors can incorporate such levers as are required to permit the lever-actuated foldaway of those ferrite elements which lie in the direction of displacement in a folded-away manner, upon the displacement of the coil, and the lever-actuated fold-out of those ferrite elements which lie against the direction of displacement.

At the same time, the interspaces formed by folding-out can be employed for the insertion of supporting elements between the moving parts, in the interests of the stability of the primary coil. This is necessary in the interests of damage-free accessibility to the floor unit in vehicles of several tons in weight.

The concept envisaged can be applied to other coil designs. It permits the horizontal adjustment of the primary coil to a highly inaccurately parked vehicle, with no resulting disadvantages in energy transmission. It permits greater tolerance in parking, i.e. in positioning. The system can be integrated flush to the road surface (with no projecting trip hazards). As only very small and lightweight components are moved, simple implementation is possible. As the field is guided in an optimum manner, electromagnetic emissions are minimized, and electromagnetic compatibility is improved.

According to a further embodiment, the charging system comprised of a primary and secondary coil is configured in an analogous, but complementary manner. This means that the secondary coil is positioned relative to the primary coil. The hinged ferrites and the positioning motors are thus also provided on the secondary side. In this configuration, the secondary ferrite, on the gravity load side, is averted from the secondary coil, such that the secondary coil lies in contact with the secondary ferrite, and essentially engages with a likewise planar housing element of the secondary coil unit, or is interposed between said housing element and the secondary ferrite. Further technical characteristics can essentially be transferred to this complementary configuration in an analogous manner.

A preferred exemplary embodiment of the invention is described hereinafter with reference to the attached drawings. Identical technical elements are identified by the same reference symbols. Further details, preferred forms of embodiment and further developments of the invention proceed therefrom. Specifically, schematic representations are provided as follows:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1A:
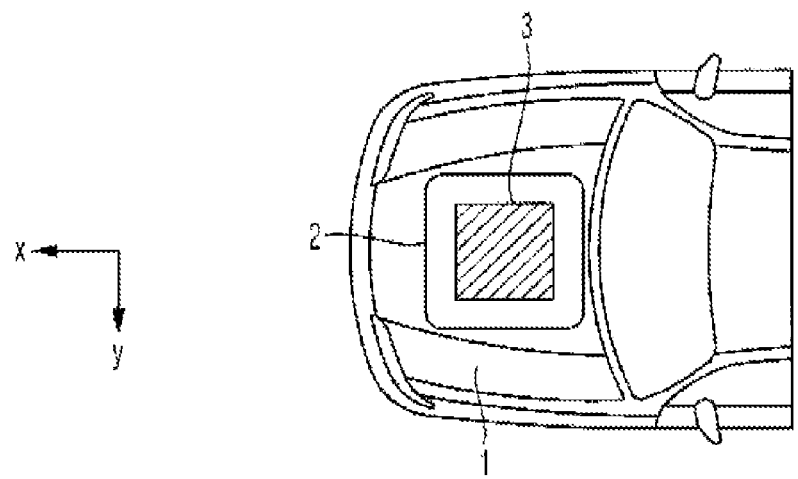
FIG. 1a (Prior art) depicts an overhead view of an inductive charging system for the charging of a vehicle.

According to the prior art, initially FIG. 1a shows an overhead view of a vehicle (1) in the z-axis, according to the axis coordinate system of vehicles which is known by a person skilled in the art. The vehicle incorporates a secondary charging unit (3), by means of which the vehicle, using an off-board primary charging unit (2), can be inductively supplied with electric power, preferably for the charging of an in-vehicle electrical or electrochemical energy store.

Figure 1B:
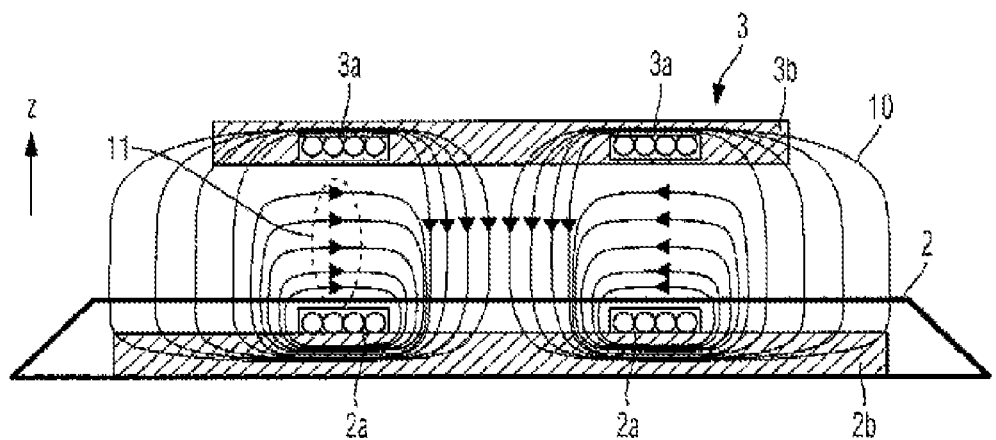
FIG. 1b (Prior art) depicts a primary charging unit, secondary charging unit and lines of magnetic flux upon the establishment of the electromagnetic coupling of a primary coil and a secondary coil in the inductive charging system.

For charging purposes, according to FIG. 1b, the secondary charging unit is positioned at a specific distance in the z-direction (the vertical axis in the spatial reference system). With respect to the x-direction (longitudinal vehicle axis) and the y-direction (transverse vehicle axis), the secondary charging unit is ideally to be positioned such that, in an overhead view (see FIG. 1a) an electric coil of the secondary charging unit (3a), insofar as possible, is centered on or coincident with an electric coil of the primary charging unit (2a). In this ideal position, in which the coils are positioned with no lateral x-y-offset, electromagnetic coupling between the two coils for the purposes of energy transmission is generally optimal. Only the z-direction then influences the degree to which the magnetic field lines of the primary field (10) permeate the secondary coil, such that electric power is inducible on the secondary side. The contribution of stray fields (11), which do not permeate the secondary coil and do not contribute to electromagnetic power transmission is ideally minimized accordingly. The magnetic flux on both the primary side and the secondary side of ferrites is employed in a targeted manner, i.e. of one ferrite in the primary charging unit (2b) and of one ferrite in the secondary charging unit (3b), which have a high magnetic conductivity, for the spatial straightening of the magnetic field lines such that the active component of the alternating magnetic field during charging is increased, and losses associated with stray magnetic field components are minimized.

Figure 2A:
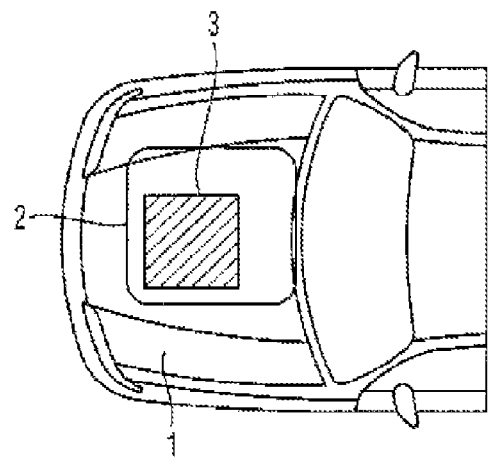
FIG. 2a (Prior art) depicts an overhead view of an inductive charging system for the charging of a vehicle, with the offset positioning of the primary charging unit and the secondary charging unit during the inductive charging of a vehicle.
Figure 2B:
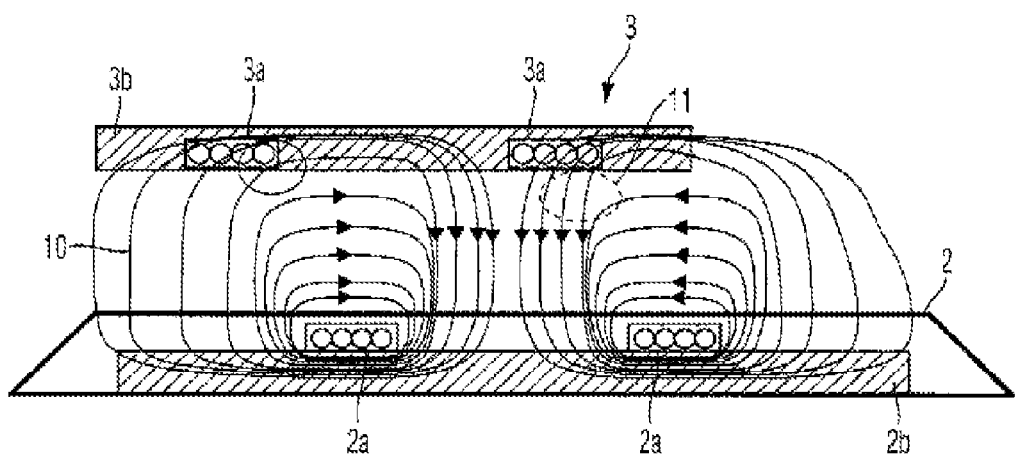
FIG. 2b (Prior art) depicts a primary charging unit, secondary charging unit and lines of magnetic flux upon the establishment of the electromagnetic coupling of a primary coil and a secondary coil in the inductive charging system, with the primary coil and the secondary coil in an offset position.

According to the prior art represented in FIGS. 1a and 1b, a problem frequently occurs in practice wherein, during the charging of the vehicle, an offset in the x-y-direction of the vehicle must be anticipated in relation to the primary charging unit (c.f. the prior art according to FIGS. 2a and 2b), as ideal positioning according to FIGS. 1a and 1b cannot be achieved in a controlled manner. In consequence, the stray field component which, according to FIG. 2b, does not contribute to charging, is increased in comparison with the situation represented in FIG. 1b, such that, in general, the at least theoretically achievable charging capacity cannot be achieved in practice, or can only be achieved with high losses.

Figure 3:
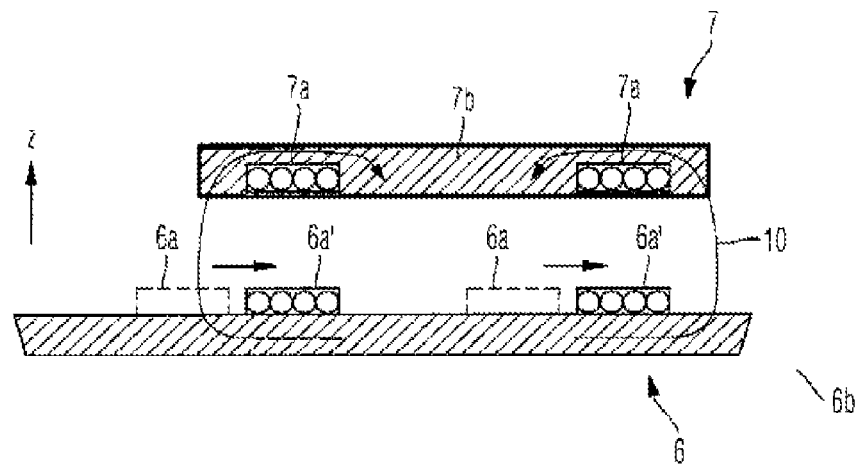
FIG. 3 depicts a primary and secondary coil unit with a movable primary coil.

FIG. 3 shows one form of embodiment of a primary coil unit (6) according to the invention, which overcomes the disadvantage known from the prior art, and incorporates an electric primary coil (6a) and a primary ferrite of a planar basic shape (6b). For the transmission of electromagnetic power from the primary coil unit to a secondary coil unit (7), which can also be a secondary coil unit having a secondary coil (7a) and a secondary ferrite (7b) from the prior art, a particularly advantageous arrangement is useful, wherein the primary coil is displaceably supported relative to the primary ferrite, perpendicularly to the z-axis. The primary coil unit and the secondary coil unit constitute an inductive charging coil system, wherein the secondary coil unit is integrated in the vehicle and the primary coil unit is located externally to the vehicle. In the interests of the simplification of representation, the requisite electronic circuits for the actuation of the coil units are not represented. If the vehicle is to be charged, for example, i.e. a transmission of power from the primary side to the secondary side takes place, the vehicle is parked in a rough position relative to the primary coil unit. The offset is compensated by the subsequent displacement of the primary coil. By means of the offset, which is detectable using a positioning system of the vehicle relative to the primary coil unit, the optimum charging position to be set for the primary coil in the x-y-plane of the primary ferrite is established.

For the optimization of the efficiency of electromagnetic power transmission, the primary coil, in the event of an offset of the secondary coil relative to the primary coil in the x- and/or y-direction, is displaced from a starting position (represented by broken lines) to a charging position. The displaced primary coil (6a'), relative to the secondary coil, a fixed position of which is assumed during the charging in accordance with the reference system of vehicle axes which will be known by a person skilled in the art, is ideally electromagnetically positioned in relation to the x- and y-axis. This means that, in the charging position of the primary coil, electromagnetic coupling, regardless of any further scope for optimization with respect to the z-axis, achieves a localized maximum value as a function of the relative position of the two coils in the x- and y-direction. This is indicated in FIG. 3 by the magnetic field components (magnetic field lines 10) which contribute to power transmission. In the charging position of the primary coil, stray field components are minimized.

Figure 4:
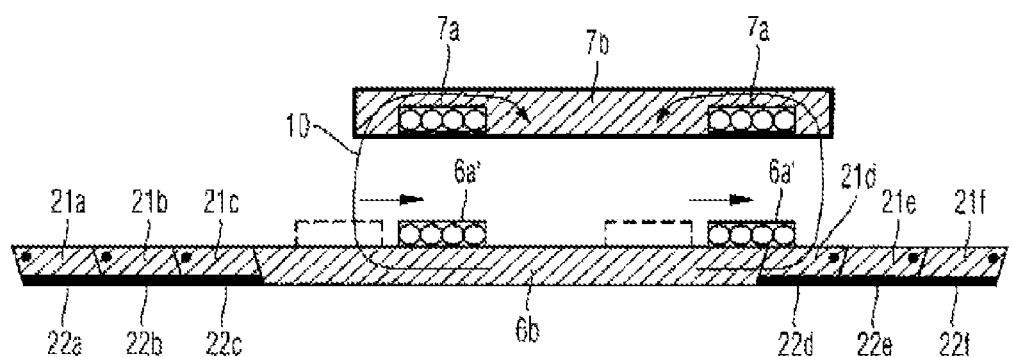
FIG. 4 depicts a primary and secondary coil unit, with a movable primary coil and movable ferrite elements.
Figure 5:
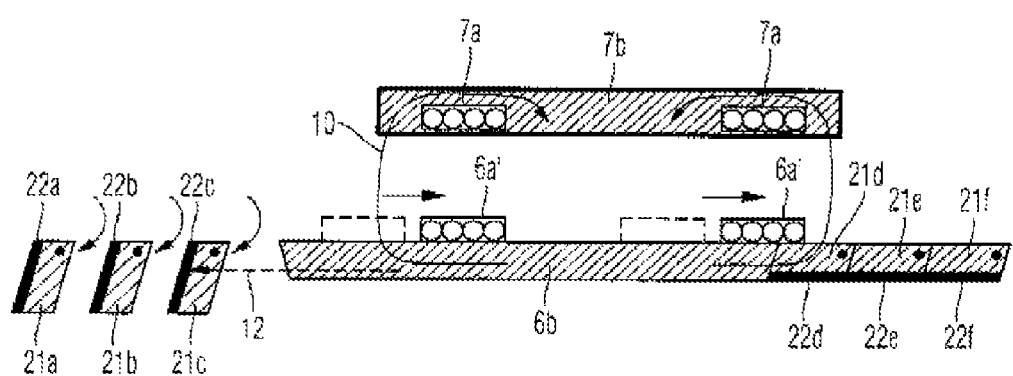
FIG. 5 depicts a charging system comprising a primary coil unit with a movable primary coil and comprising a secondary coil unit with folded-out ferrite elements and folded-away ferrite elements.
Figure 6:
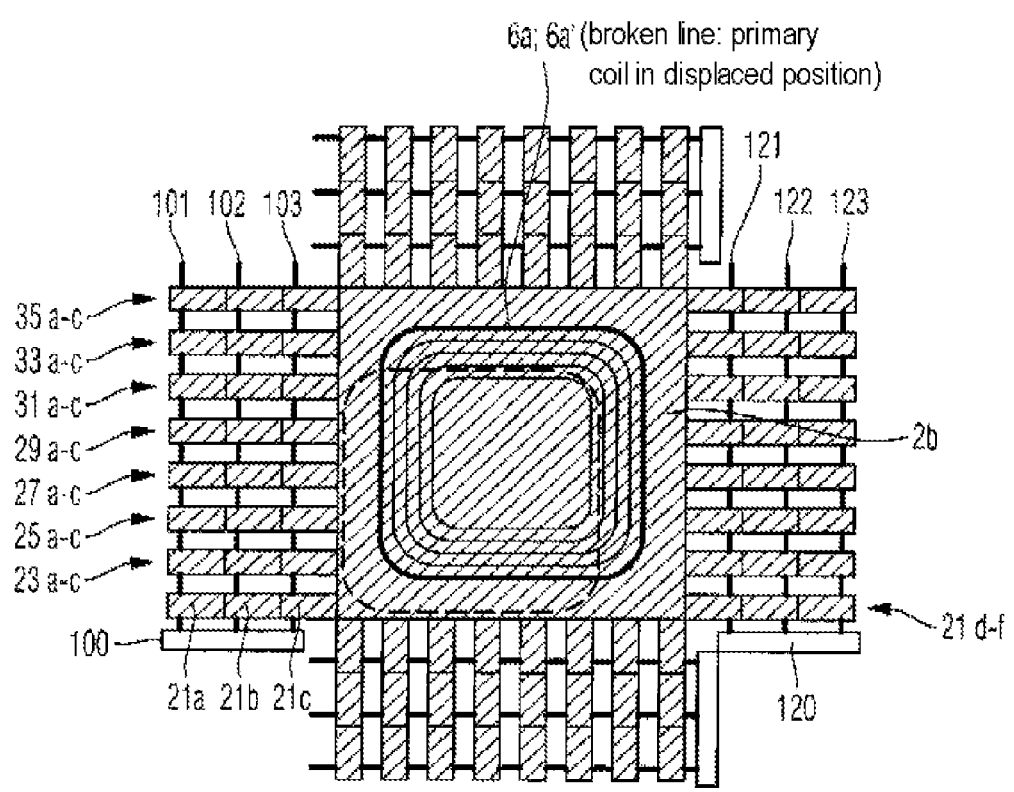
FIG. 6 depicts an overhead view of the primary coil unit, with an arrangement of foldaway ferrite elements along the periphery of the primary ferrite.

FIGS. 4, 5 and 6 show a further form of embodiment of the primary coil unit according to the invention. The primary ferrite is supplemented by ferrite elements (21a to f) of the primary coil unit. The ferrite elements are essentially comprised of the same magnetically conductive material as the primary ferrite. Optionally or additionally, the ferrite elements incorporate screening elements (22a to f), wherein one screening element respectively is assigned to each ferrite element. The screening elements are configured as magnetic screening plates. The ferrite elements are configured, either individually or in groups, in a foldaway or fold-out arrangement in the plane of the primary ferrite, which assumes a planar basic shape. In the folded-away state, the primary ferrite and the ferrite elements, or the ferrite elements, are arranged in mutual contact. In the folded-away state (c.f. 21d to f in FIGS. 4 and 5), a direct magnetically-conductive transition thus exists between the primary ferrite and the ferrite elements. The magnetic flux can thus be conducted, with reduced electromagnetic losses, from the primary ferrite via the ferrite elements which are folded-away into the plane of the primary ferrite. Where ferrite elements are folded-out of this plane (c.f. 21a to c in FIGS. 4 and 5), magnetic conduction of the magnetic flux from the primary ferrite to the folded-out ferrite elements is suppressed, given that, in the vicinity of the two-fold material transition from the primary ferrite to air and vice versa, and of the screening elements which are arranged virtually perpendicularly to the plane of the primary ferrite, magnetic field lines, in the direction of propagation of the folded-out ferrite elements, are screened (c.f. screened stray field line 12).

From the overhead view in FIG. 6, it will be seen that the primary charging unit incorporates a plurality of ferrite elements (23a-c, 25a-c, 27a-c, 29a-c, 31a-c, 33a-c, 35a-c and, analogously, so forth), arranged along the periphery of the primary ferrite. The ferrite elements (21a, 23a, 25a, 27a, 29a, 31a, 33a, 35a) constitute a sub-group of ferrite elements, to which one first ferrite suspension device (101) is common. The ferrite suspension device constitutes an axis, around which the constituent ferrite elements of the sub-group are hinged.

The hinging of ferrite elements is executed by a ferrite element mechanism (first ferrite element mechanism 100). A second and a third ferrite suspension device (102, 103) are assigned to the first ferrite element mechanism, which respectively comprise further sub-groups of ferrite elements. The sub-groups of ferrite elements assigned to the ferrite element mechanism constitute a group of ferrite elements. The three ferrite suspension devices assigned to the first ferrite element mechanism can be actuated in a mutually independent manner by the ferrite element mechanism.

The ferrite element mechanism can hinge the entire group of ferrite elements, by the rotation of the associated ferrite suspension devices, or individual sub-groups of ferrite elements, by the rotation of the relevant individual ferrite suspension device. Along the periphery of the primary ferrite, three further ferrite element mechanisms, correspondingly arranged with respect to the first ferrite element mechanism and functioning accordingly (c.f., for example, second ferrite element mechanism 120), are located. The second ferrite element mechanism serves the three ferrite suspension devices (121, 122, 123), which respectively incorporate sub-groups of ferrite elements. Actuation of the ferrite element mechanism can be executed via a mechanical coupling with the positioning motors, which are designed for coil displacement. A fixed assignment of the hinging state of individual ferrite sub-groups in relation to the position of the primary coil in the x-y-plane is possible. Accordingly, hinging can be tripped by displacement along the displacement path executed by the positioning motors of the coil.

According to a further form of embodiment of the invention, all the ferrite elements may be individually hinged, i.e. independently of all the other ferrite elements respectively.

With reference to FIG. 5, an embodiment of the method according to the invention is described, by means of which an electric power supply is delivered to an electrical component which is connectable, on the secondary side, to a charging system comprising a primary coil unit (6) and a secondary coil unit (7).

The secondary coil unit is roughly positioned, relative to the primary coil unit. In a further step, the primary coil (6a), relative to the primary ferrite (6b), is displaced into the charging position (6a'). Optionally or additionally, the ferrite elements which establish the optimum ferrite profile of the displaced primary coil are folded away into the plane of the primary ferrite, in order to guide the magnetic field lines of the power-transmitting alternating magnetic field through the two coils with the maximum possible reduction of losses. Moreover, the ferrite elements which are arranged with a substantial clearance from the displaced primary coil, and do not contribute to the improved coupling of the coils, are optionally or additionally folded out of the plane of the primary ferrite, in order to screen out or suppress any stray magnetic fields which transmit no power. It is advantageous if the displacement path of the primary coil and the offset of the primary coil unit and the secondary coil unit in the rough position are determined or monitored prior to the commencement of the positional optimization of the primary coil within the primary coil unit. It can thus be determined which ferrite elements need to be hinged, in order to constitute the magnetically active surface by the foldaway or fold-out of ferrite elements whereby the primary coil, in the charging position, will be centered in relation to said surface.

LIST OF REFERENCE SYMBOLS

1 Vehicle
2 Primary charging unit
2a Coil of primary charging unit
2b Ferrite of primary charging unit
3 Secondary charging unit
3a Coil of secondary charging unit
3b Ferrite of secondary charging unit
6 Primary coil unit
6a Primary coil
6a' Displaced primary coil
6b Primary ferrite
7 Secondary coil unit
7a Secondary coil
7b Secondary ferrite
10 Magnetic field lines
11 Stray field lines
12 Screened stray field line
21a-f Respective ferrite elements
22a-f Respective screening elements
23a-c Respective ferrite elements
25a-c Respective ferrite elements
27a-c Respective ferrite elements
29a-c Respective ferrite elements
31a-c Respective ferrite elements
33a-c Respective ferrite elements
35a-c Respective ferrite elements
100 First ferrite element mechanism
101 First ferrite suspension device, associated with the first ferrite element mechanism
102 Second ferrite suspension device of the first ferrite element mechanism
103 Third ferrite suspension device of the first ferrite element mechanism
120 Second ferrite element mechanism
121 First ferrite suspension device of the second ferrite element mechanism
122 Second ferrite suspension device of the second ferrite element mechanism
123 Third ferrite suspension device of the second ferrite element mechanism The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A primary coil unit configured for electromagnetically coupling with a secondary coil unit, wherein the primary coil unit comprises:
   a primary coil and a primary ferrite,
   wherein the primary coil is not rigidly connected to the primary ferrite such that the primary coil is moveable relative to the primary ferrite from a starting position for the electromagnetically coupling to a charging position for the electromagnetically coupling,
   wherein the primary coil unit incorporates a plurality of ferrite elements,
   wherein the plurality of ferrite elements are arranged relative to the primary ferrite, such that the primary ferrite, along a periphery of the primary ferrite, is entirely enclosed by the plurality of ferrite elements,
   wherein the plurality of ferrite elements comprises groups and sub-groups of ferrite elements, wherein the primary coil unit, for each respective sub-group of ferrite elements, incorporates a respective ferrite suspension device for the constituent ferrite elements of the sub-group, and
   wherein one group of ferrite elements comprises a plurality of sub-groups of ferrite elements, wherein the primary coil unit, for each respective group of ferrite elements, comprises a ferrite element control unit, by which the respective ferrite suspension devices of the constituent sub-groups of ferrite elements in the group are controllable, in order to fold away or fold out the ferrite elements in a sub-group.

2. The primary coil unit as claimed in claim 1,
wherein the primary ferrite assumes a planar basic shape, having a first side and a second side, and
wherein the primary ferrite is configured to accommodate the primary coil in the weight thereof, in a cooperating arrangement with the first side of the planar basic shape.

3. The primary coil unit as claimed in claim 1,
wherein the plurality of ferrite elements incorporate a respective magnetically non-conductive screening element.

4. The primary coil unit as claimed in claim 1,
wherein the primary coil unit is configured to electromagnetically couple with the secondary coil unit such that an electrical component connected on a secondary side, which corresponds to the secondary coil, is supplied with electric power.

\* \* \* \* \*